United States Patent
Ronda et al.

(10) Patent No.: US 9,300,665 B2
(45) Date of Patent: Mar. 29, 2016

(54) CREDENTIAL AUTHENTICATION METHODS AND SYSTEMS

(75) Inventors: Troy Jacob Ronda, Toronto (CA);
Andre Boysen, Huntsville (CA); Afshin Rezayee, Richmond Hill (CA); Malcolm Ronald Smith, Toronto (CA); Mikhael Khaymov, Toronto (CA); Kshitiz Vadera, Toronto (CA); Murat Cat, Hamburg (DE)

(73) Assignee: SecureKey Technologies Inc., Toronto, Ontario (CA)

( * ) Notice: Subject to any disclaimer, the term of this patent is extended or adjusted under 35 U.S.C. 154(b) by 188 days.

(21) Appl. No.: 14/124,891

(22) PCT Filed: May 29, 2012

(86) PCT No.: PCT/CA2012/000522
§ 371 (c)(1),
(2), (4) Date: Dec. 9, 2013

(87) PCT Pub. No.: WO2012/167352
PCT Pub. Date: Dec. 13, 2012

(65) Prior Publication Data
US 2014/0101734 A1    Apr. 10, 2014

Related U.S. Application Data

(60) Provisional application No. 61/495,704, filed on Jun. 10, 2011.

(51) Int. Cl.
*H04W 12/06* (2009.01)
*H04L 29/06* (2006.01)
*H04L 9/32* (2006.01)
*G06F 21/34* (2013.01)
(Continued)

(52) U.S. Cl.
CPC ............ *H04L 63/0884* (2013.01); *G06F 21/34* (2013.01); *G06F 21/6227* (2013.01);
(Continued)

(58) Field of Classification Search
CPC .......................... G06Q 20/351; G06Q 20/342
See application file for complete search history.

(56) References Cited

U.S. PATENT DOCUMENTS 7,748,031 B2    6/2010 Gonzalez et al.
7,840,812 B1 *  11/2010 Levenberg .................... 713/176
(Continued)

FOREIGN PATENT DOCUMENTS

WO    2011127354 A2    10/2011

OTHER PUBLICATIONS

Int'l Search Report issued Sep. 12, 2012 in Int'l Application No. PCT/CA2012/000522.

*Primary Examiner* — Venkat Perungavoor
(74) *Attorney, Agent, or Firm* — Panitch Schwarze Belisario & Nadel LLP

(57) ABSTRACT

Methods and systems are provided for performing and verifying transactions involving authentication with a secure credential, such as a smart card, in an untrusted or semi-trusted environment. An application module, operating in an untrusted or semi-trusted environment can be denied access to sensitive data. The application module can determine a preliminary command to be sent to the credential and transmit the preliminary command to a broker module. The broker module, operating in a trusted environment, can supply sensitive data and transmit the command to the credential. Subsequently, the broker module can extract sensitive data from a response before it is transmitted to the application module. A verification server can audit the transaction to verify that it was carried out properly.

24 Claims, 4 Drawing Sheets

(51) Int. Cl.
*G06F 21/62* (2013.01)
*G06F 21/74* (2013.01)
*G06Q 20/34* (2012.01)
*G06Q 20/38* (2012.01)
*G06F 21/64* (2013.01)

(52) U.S. Cl.
CPC .............. *G06F21/74* (2013.01); *G06Q 20/341* (2013.01); *G06Q 20/3821* (2013.01); *H04L 9/3234* (2013.01); *G06F 2221/2101* (2013.01); *H04L 2209/56* (2013.01)

(56) References Cited

U.S. PATENT DOCUMENTS

| | | | |
|---|---|---|---|
| 8,322,610 B2 * | 12/2012 | Guthery | 235/382 |
| 2008/0017704 A1 * | 1/2008 | VanDeburg et al. | 235/380 |
| 2008/0088188 A1 * | 4/2008 | Busch | 310/68 B |
| 2009/0070272 A1 | 3/2009 | Jain | |
| 2009/0300747 A1 | 12/2009 | Ahn | |
| 2011/0264926 A1 * | 10/2011 | Guthery | 713/193 |

* cited by examiner

CREDENTIAL AUTHENTICATION METHODS AND SYSTEMS

CROSS-REFERENCE TO RELATED APPLICATION

This application is a Section 371 of International Application No. PCT/CA2012/000522, filed May 29, 2012, which was published in the English language on Dec. 13, 2012, under International Publication No. WO 2012/167352 A1, and claims the benefit of U.S. Provisional Patent Application 61/495,704, filed Jun. 10, 2011, the disclosures of which are incorporated herein by reference.

The embodiments described herein relate to methods and systems for authenticating a credential and, in particular, for authenticating a credential via an untrusted or semi-trusted computing environment.

INTRODUCTION

There are many situations in which a user may be required to authenticate identity by providing one or more credentials (in the form of data or assertions) as a prerequisite to engaging in, or completing, a transaction. Examples of such situations include logging into a website, conducting an e-commerce transaction, or providing proof of a claim (e.g., majority age). The party that requires proof of an authentication may be considered a "Relying Party" (RP).

One common method of authenticating with a RP is by providing a username and password. Unfortunately, the username and password authentication paradigm is vulnerable to many forms of attack, such as key loggers and phishing. Accordingly, to enhance the transaction process, a RP may require additional factors as part of the transaction process. Examples of additional factors include a "what you have" factor, such as a USB dongle, or a "what you are" factor, such as a fingerprint. To facilitate the use of "what you have" factors, a RP may employ credential tokens and hardware devices designed to read the credential tokens. The credential tokens may be issued by the RP, or they may be issued by a third party.

In cases where the RP is not the issuer of the credential token, the issuer may validate the credential token on behalf of the RP when the token is used.

Credential tokens may comprise dedicated embedded electronic devices (e.g., credit card chips, e-passports, mobile phone subscriber identity modules, and USB tokens). In some cases, credential issuers may incorporate credentials into other commodity devices (e.g., contactless credit cards within mobile phones).

Frequently, cryptographic techniques can be used to verify that the credential token is genuine. Moreover, electronic credential tokens may employ various security measures for both storage and transmission of credential and transaction data. For example, higher-end devices may provide tamper resistant storage, mutual authentication during transmission, and end-to-end encryption between the token and the reader.

Credential token readers can be stand-alone devices or embedded within other host devices, such as USB dongles, personal computers, tablets, mobile phones, set-top boxes, etc. Reader devices may also support various security measures including, of course, those required by the credential token being read.

A variety of methods can be used to communicate with an electronic credential token, including contact-based communication, contactless communication, or networked communication, such as the Internet. Additionally, reader devices may be configured to read "external" credential tokens (e.g., an independent form factor token such as a card) or "internal" credential tokens (e.g., tokens embedded within the same host device as the reader).

SUMMARY

In a first aspect, there is provided a method of performing a secure transaction between an application module and a credential. The method can comprise: determining, using a processor, a preliminary command to be sent to the credential; transmitting the preliminary command from the application module to a broker module; generating a transformed command based on the preliminary command; transmitting the transformed command to the credential; receiving a preliminary response from the credential; at the broker module, generating a transformed response; and transmitting the transformed response to the application module.

The transformed command may be generated by the application module, or it may be generated by the broker module and transmitted securely to the application module. The transformed command may be transmitted securely from the application module and the preliminary response may be transmitted securely to the application module.

The broker module may have access to at least one sensitive data item to which the application module does not have access.

The method may further comprise, prior to generating the transformed command, transmitting the at least one sensitive data item from a verification server to the broker module via a secure session.

The method may further comprise, prior to generating the transformed command, generating the at least one sensitive data item at the broker module.

At least one sensitive data item may comprise predetermined data stored at the broker module.

The preliminary command may comprise a command template.

The command template may comprise a command tag associated with at least one sensitive data item, and the broker module may insert the at least one sensitive data item when the transformed command is generated.

The preliminary command may comprise a response template.

The transformed response may be based on the response template.

The response template may comprise a whitelist that identifies at least one non-sensitive data item, and the at least one non-sensitive data item can be revealed to the application module.

The response template may comprise at least one response tag associated with at least one sensitive data item, and the broker module may extract and obscure the at least one sensitive data item when the transformed response is generated based on the at least one response tag.

The method may further comprise verifying the secure transaction at a verification server.

In accordance with at least some embodiments, verifying may further comprise: transmitting an audit log to the verification server via the secure session; transmitting the preliminary command and the transformed response from the application module to the verification server; at the verification server, reconstructing a reconstructed transformed command and a reconstructed preliminary response based on the preliminary command, the transformed response and the audit log; extracting at least one hash digest from the audit log; and comparing the at least one hash digest extracted from the audit log to a newly-generated at least one hash digest of the reconstructed transformed command and the reconstructed preliminary response.

The method may further comprise simulating the reconstructed transformed command to obtain a simulated preliminary response, and comparing the simulated preliminary response to the reconstructed preliminary response.

The method may further comprise transmitting the command template and the response template from the application module to the verification server, wherein the reconstructing is also based on the command template and the response template.

The application module and the broker module may be provided on a single computing device. The application module and the broker module may also be provided on one or more separate devices, and the application module and the broker module can communicate via a data network.

In another aspect, there is provided a method of verifying a secure transaction between an application module that is untrusted and a credential that is trusted. The method can comprise: performing the secure transaction between the application module and the credential via the broker module to generate transaction data, the transaction data comprising one or more commands and one or more responses; filtering the transaction data that is transmitted to the application module to remove at least one sensitive data item; transmitting the filtered transaction data from the application module to the verification server; transmitting verification data corresponding to the transaction data from the broker module to the verification server via a secure session, the verification data comprising an audit log based on the transaction data; at the verification server, generating reconstructed transaction data based on the at least one sensitive data item and the filtered transaction data; and determining if the reconstructed transaction data corresponds to the transaction data.

The filtered transaction data can further comprise at least one template used in the secure transaction and the verification data can comprise a first hash digest of the at least one template. The method may further comprise generating a second hash digest of the at least one template at the verification server, and comparing the second hash digest to the first hash digest of the at least one template transmitted by the broker module.

In a further aspect, there is provided a system for performing a secure transaction. The system can comprise: a credential; a broker module; and an application module, wherein the application module is configured to: determine a preliminary command to be sent to the credential; and transmit the preliminary command to a broker module, and wherein the broker module is configured to: generate a transformed command based on the preliminary command; transmit the transformed command to the credential; receive a preliminary response from the credential; generate a transformed response; and transmit the transformed response to the application module.

DRAWINGS

For a better understanding of the various embodiments described herein, and to show more clearly how they may be carried into effect, reference will now be made, by way of example only, to the accompanying drawings which show at least one exemplary embodiment, and in which.

Figure 1:
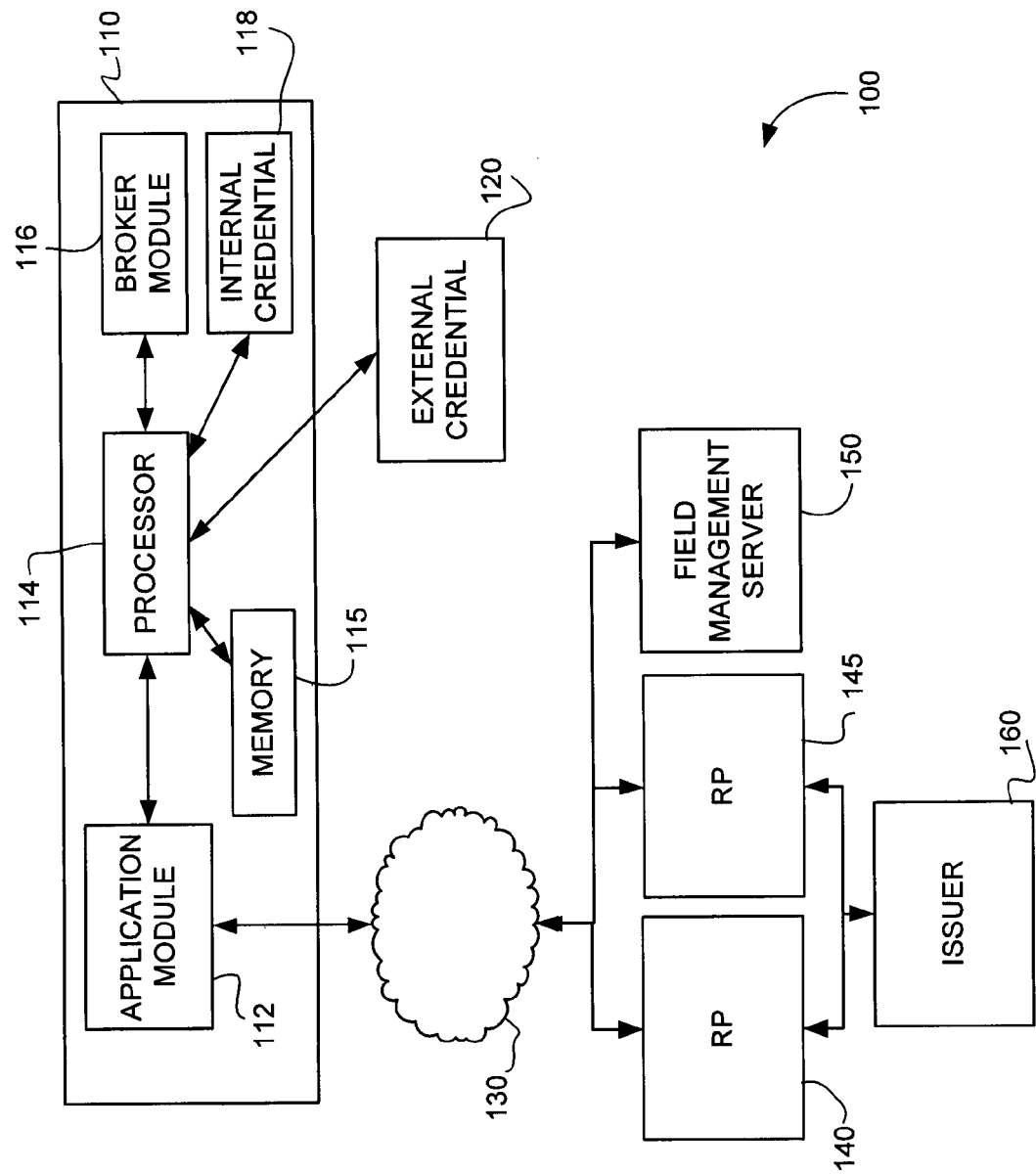
FIG. 1 is an exemplary authentication system in accordance with some embodiments.

The skilled person in the art will understand that the drawings, described below, are for illustration purposes only. The drawings are not intended to limit the scope of the applicants' teachings in any way. Further, where considered appropriate, reference numerals may be repeated among the figures to indicate corresponding or analogous elements.

DESCRIPTION OF VARIOUS EMBODIMENTS

Despite the benefits associated with requiring additional factors of authentication, providing these factors, such as a "what you have" factor, may create challenges. In particular, deploying the additional credential factors can be costly, and deployment of the associated credential reading equipment can be especially costly and inefficient.

Described herein are methods and systems that can exploit credential tokens and/or credential reading equipment that are already deployed. For example, contactless credit cards can be leveraged as a credential token and near-field communication capable (NFC) mobile phones can be leveraged as the credential reading devices. Other examples include leveraging PCs, set-top boxes, peripherals, and tablets with embedded credential reading equipment. Many form factors of credential tokens can be leveraged, including credit cards, key-chains, USB or Bluetooth dongles, and credentials housed within a network (e.g., cloud) server or computer, etc.

A credential issuer may choose to validate a credential token on behalf of a RP, either by having the issuer communicate directly to the credential reader hardware or indirectly via the RP. If the RP has a relationship with the credential issuer (or a third party broker), the RP may also leverage the credential as a "what you have" authentication factor. Accordingly, the credential issuer can verify credentials it has issued and, therefore, can use some or all of their existing mechanisms for determining or confirming a user's identity.

An example of a "what you have" credential that many users already possess is their chip-enabled or contactless credit cards. Today's chip-enabled credit cards are typically designed to work with a trusted terminal (e.g., a point-of-sale terminal at a retail establishment). Common chip-enabled credit cards provide authentication using, among other things, a cryptogram which takes terminal transaction data and internal chip data (such as a counter) as inputs, and creates a message authentication code (MAC) using a protected symmetric key. The credit card issuer can authenticate the cryptogram by generating the same cryptogram using the same inputs and the same key. Based on the cryptogram, the issuer can be certain (to a high probability) that a genuine card produced the cryptogram.

Users may also have many "what you are" factors available for use in authentication. Typical examples of "what you are" factors include fingerprints and irises. However, use of these factors may be susceptible to the same forms of attack that credentials like one-time password (OTP) tokens and passwords can face, including man-in-the-middle, malware, and phishing attacks. However, the "what you are" factor has the additional drawbacks of being relatively static.

To increase the security and reliability of such "what you are" factors, the credential can be both read and delivered securely. Additionally, the credential can be "witnessed" by a trusted environment (e.g., a log of the interactions with the credential can be created within a trusted environment and signed or otherwise securely).

In general, credentials can be best protected by ensuring that they are only read, processed, and any related sensitive information is transmitted and received only within a trusted computing environment. A trusted computing environment may be an environment that has one or more of the following general characteristics: the user should know and trust the device that operates the trusted environment (e.g., a personal device or a trusted third party device like a point-of-sale terminal) and should have some level of assurance that physical tampering has not occurred; the environment should only run trusted program code (e.g., code verified and signed by a reliable third party); sensitive data should only be delivered to authenticated and authorized servers or devices and the data should be delivered within a secure channel; the environment should have a direct (or otherwise secure) connection to the credential reading device, where direct means the channel is independent of untrusted devices, processors and processes; the device that operates the trusted environment should be able prove to the issuer or RP server that it is a known and trusted environment; the environment should either be single-purpose or be able to securely sandbox individual applications (e.g., using virtual machines); and the entire device should be contained within a tamper-resistant or tamper-evident enclosure.

An environment may still be trusted for certain applications even if it does not satisfy every criterion in the preceding list. In some cases, the number or quality of achieved security characteristics can be mapped to a security assurance level (e.g., Level 1 only runs trusted code, Level 2 has tamper-resistance properties, etc). Accordingly, a personal USB dongle containing an independent microcontroller may be suitable for use as a type of trusted computing environment, even without tamper-resistance characteristics, for some applications and provided some additional degree of assurance is used (e.g., when used with authenticating servers and secure channels).

Devices which exhibit a subset of the desired characteristics of a trusted environment may be considered to provide semi-trusted environments. This added flexibility allows for commodity hardware to be used to provide some trusted computing facilities. For example, a semi-trusted environment may be operated using general purpose computing devices, such as a PC, mobile phone, tablet, set-top box, USB dongle, and the like, to provide credential reading services.

Described herein are methods and systems for authenticating both external credential tokens (e.g., credit, debit, health, authentication, and identity cards in physical form, such as within a card or phone, or stored "virtually" in a cloud server) and internal credential tokens (e.g., credit, debit, health, authentication, and identity cards stored within a host device including credentials stored in the SIM/UICC or secure element of a mobile phone). These credential tokens may be referred to simply as "credentials" and may be processed, securely delivered, and used (e.g., for authentication, payment, form filling, coupons, identity verification, pin reset, etc.) at a variety of trusted, untrusted and semi-trusted devices while protecting sensitive credential data against disclosure to the host device comprising (or connected to) the credential reader.

Sensitive credential data may be safeguarded in several ways.

In some embodiments, a secure application program operating in a trusted computing environment is enabled to read a credential token independently of untrusted elements of the host device and device operating system.

In some other embodiments, data read (either internally or externally) from the credential token is filtered by a secure application program, which masks sensitive data from untrusted elements of the host device while also creating a digest (e.g., cryptographic signature or message authentication code) of steps in the transaction process (e.g., commands and responses exchanged with the credential token).

In still other embodiments, a secure application may be configured to directly send commands to the credential via a secure path, independently of the host device and device operating system.

In some embodiments, a secure application may be configured to authenticate and communicate with a third party server via a network, and the third party server may be configured to act as a credential token, or to transmit credential data to the relying party via a secure, out-of-band channel (e.g., without involving the host device).

In addition, in some embodiments, the security of a credential token may be augmented by binding the token to another credential type. For example, a password or other "what you have" or "what you are" factor may be required before the credential token is authenticated. Likewise, the credential token may be configured only to operate in a trusted computing environment, which can be identified with a predetermined set of trusted computing environment identifiers (e.g., the authenticating server can verify that it is communicating with a trusted computing environment before accepting the credential).

A trusted computing environment may also be configured to prevent the host device from interacting with a predetermined list of banned credentials (e.g., the trusted computing environment could block the host device from interacting with contact or contactless credit cards, debit cards or identity cards).

A naïve approach to leverage credentials would be to simply use them "as is". For example, an application program could be designed to directly request a cryptogram from a credit card. However, many credentials are designed to operate within a trusted computing environment (e.g., a certified terminal such as a POS). Accordingly, such an application program would be unlikely to receive authorization from card issuers to operate in this manner.

Accordingly, when operating in a less trusted environment (e.g., on a PC or mobile phone), attempts should be made to mitigate potential attacks before trusting a credential or the environment itself. For example, a one-time password (OTP) credential or a chip-enabled credit card is particularly vulnerable to attacks such as malware, man-in-the-middle, phishing, and session hijacking as these types of credentials cannot guarantee data security once data is communicated from the credential. That is, the credential inputs and outputs are not typically hidden from the credential reading device. Accordingly, if such credentials are used with a personal computer, malware may be capable of monitoring or altering inputs and/or outputs without detection. If the malware detects sensitive data in the credential output, it may be able to use the sensitive data (e.g., cryptogram, signature, OTP, shared secret, etc.) for unauthorized or illicit purposes, such as logging into a bank account or performing a payment.

In addition, unique identifiers specific to the credential may also be used for additional purposes beyond authentication (e.g., the credit card verification code and expiry are commonly used in e-commerce). Accordingly, it would be advantageous to hide this type of sensitive information from untrusted environments to avoid misuse.

Many "non-technical" attacks against commonly-used credentials like credit cards should also be considered. For example, it is common today to give a credit card to a waiter at a restaurant, and for the waiter to take the card into another area of the restaurant to perform some or all of the payment transaction using the card. Accordingly, an unscrupulous waiter could potentially use the card in an unauthorized manner.

These attacks can be mitigated, for example, by adding additional factors of authentication (e.g., a password) to provide greater assurance of identity; or binding additional "non-identity" factors of authentication to the credential (e.g., "what you have" factors).

These approaches "strengthen" the credential with additional factors of authentication—particularly where the credentials traditionally have been used for other purposes. Although the credentials may be designed for other purposes, they may be useful because they can leverage an existing identity relationship and thus be used as a "what you have" factor, which the relying party already trusts (either directly or indirectly via contracts or agreements).

A hybrid approach can also be used. The hybrid approach may comprise using a trusted environment to "witness" or "notarize" or "broker" a transaction. The trusted environment can be a module comprising a relatively small application program and/or device. In some cases, this small trusted environment may also be provided with its own credential, such as a cryptographic private key, which can be used to create a signature but need not be associated with the user.

In the hybrid approach, an application module can provide most of the credential reading logic, and can reside in an untrusted or semi-trusted environment. However, the "broker" module can reside in a small trusted environment. The broker module can be used to verify that a transaction is authentic by logging interactions with a credential. For example, a signed hash digest of every command and response exchanged between a computing device and a credential reading device may be logged and subsequently transmitted to a RP for further verification or validation.

A mobile phone provides one example of the hybrid approach. A mobile phone can have an operating system and third-party applications forming a semi-trusted environment. In addition, the mobile phone may have a universal integrated circuit card (UICC), subscriber identity module (SIM) or other embedded secure elements, which can be considered a small trusted environment.

UICC, SIM and embedded secure element environments generally have limited storage space, and lack reliable mechanisms for updating program code stored on the UICC, SIM or embedded secure element devices. Program code may need to be updated (e.g., by a field management server) on a regular basis to provide a new "parser" for each type of credential that may be used. A parser contains the instructions for communicating with a specified credential type (e.g., to obtain a cryptogram from a credit card or an OTP from an OTP dongle). As new credential types are released, new parsers may be required. Additionally, program code may also need to be updated over time by the field management server to patch software bugs, which could be more prevalent as additional credential types are supported.

By placing parsing code outside the trusted environment, the program code required to operate the trusted environment can be minimized, thus requiring less storage space and fewer updates. In particular, the trusted environment can be used specifically to "broker" transactions, to store sensitive data and to prevent transmission of the sensitive data to untrusted or semi-trusted environments.

To broker transactions, a broker module provided in a trusted environment may intercept, log (e.g., store hash digests), modify commands being sent by a semi-trusted application module to a credential (e.g., a SIM, a chip-enabled credit card, a NFC device, etc.), and modify the responses being delivered back to the application module.

Accordingly, the broker module can generate an "audit log" of the transaction and provide this audit log, which may be signed by the broker module, to a relevant and authorized server, such as a credential issuer or RP.

In some embodiments, the broker module may be configured to "fill-in" sensitive data into command templates, which may be provided by the application module. This sensitive data can be securely transmitted between the broker module and the server prior to, or during the transaction. Additionally, some sensitive data may be stored locally by the broker module, or securely retrieved from the credential.

Similarly, the broker module may be configured to remove sensitive data from responses. The broker module may identify which sensitive data to remove based on a response template, which may be provided by the broker module.

In some embodiments, the application module may be a mobile application running, for example, on a mobile phone. Accordingly, the mobile application may be considered to operate in a semi-trusted environment and may be restricted from receiving sensitive data. However, in some other embodiments, the application module need not be in a computing environment where there is a need for trust in the transaction process. Accordingly, trusted, semi-trusted, and even untrusted elements could be involved in the transaction process.

The application module may be an application program executed by a processor, such as a microcontroller. The processor can be an independent device configured to securely communicate with the broker module and credentials and/or credential readers. Depending on the security measures provided by the processor (e.g., process segregation), it may be considered part of a trusted environment. In some cases, one or more of the processor, broker module and credential reader device, and even application module, may be combined into one device, or subdivided among a plurality of devices.

Referring now to FIG. 1, there is shown an exemplary authentication system 100. Authentication system 100 comprises a computing system 110, an external credential 120, a network 130, relying party servers 140 and 145, a field management server 150 and an issuer server 160.

Computing system 110 may be a computing device comprising an application module 112, a processor 114, a memory 115, a broker module 116 and an internal credential 118. Computing system 110 may also comprise additional elements (not shown), such as a data communications interface, user interface display, and the like. For example, in one embodiment, computing system 110 is a mobile device, such as a smartphone or computing tablet.

In some alternative embodiments, computing system 110 may comprise several discrete devices dedicated to application module 112, broker module 116 and/or internal credential 118, respectively. Each of the discrete devices may comprise its own processor 114, memory 115 and other components for communication with each of the other respective discrete devices.

Processor 114 may be a general purpose microprocessor, a field programmable gate array, application specific integrated circuit, or the like. In some embodiments, processor 114 may be configured to operate in a trusted mode and an untrusted mode. In the trusted mode, processor 114 can securely execute trusted code in such a manner that sensitive data cannot be accessed by untrusted code.

Memory 115 may comprise one or more volatile and non-volatile memory elements used to store program code for use by processor 115 and to provide temporary storage for use by programs, in known manner. If more than one processor 114 is provided, each may have its own dedicated memory 115. Alternatively, memory 115 may provide memory segregation between processes, particularly between trusted and untrusted code (such that an individual process cannot view or modify memory used by another process).

In some cases, application module 112 may be a software application program stored in memory 115 and executed by processor 114. In some other cases, application module 112 may also comprise hardware, such as a programmable processor. The operation of application module 112 is described further herein.

Similarly, broker module 116 may be a software application program stored in memory 115 and executed by processor 114. If broker module 116 is executed using the same processor 114 as application module 112, then broker module 116 may be executed while processor 114 is operating in a trusted mode. In some other cases, broker module 116 may also comprise hardware, such as a programmable processor, and may be provided as part of a distinct device to prevent tampering via software.

In still other cases, broker module 116 may be provided by a secure element integrated into a subscriber identity module (SIM), a universal integrated circuit card (UICC), a near-field communication or contactless element, and the like. In some cases, secure elements can be stand-alone chips or embedded in other chips. Broker module 116 may also be incorporated into another module, such as a cryptographic module, or the like.

If broker module 116 is stored in software application form, the program code may be marked as read-only and/or cryptographically signed to ensure that it is not altered by malicious software. In some cases, broker module 116 may be stored in a segregated portion of memory 115, or in a physically distinct memory (not shown).

The operation of broker module 116 is described further herein.

Internal credential 118 may comprise any credential provide inside computing system 110, using either a permanent, semi-permanent or temporary connection. For example, internal credential 118 may be a SIM, UICC or the like. In some cases, internal credential 118 may also comprise distinct hardware, such as a processor and memory, to prevent tampering by an untrusted element.

External credential 120 may comprise any credential provided outside computing system 110, including but not limited to contact-based and contactless smart cards, RF cards, NFC cards, USB tokens, and the like. In some examples, the external credential may be provided over a data network.

Network 130 may comprise one or more private or public data networks, such as the Internet, to enable communication between computing system 110 and relying party servers 140 and 145, field management server 150 and issuer server 160.

Relying party servers 140 and 145 may be servers authorized to communicate with application modules and broker modules during a credential-based transaction. In some cases, relying party servers may be provided by a third party credential broker service, which isolates relying party entities from the actual credential processing.

Field management server 150 may be used provide updates to application modules and broker modules. Field management server 150 may also be used to maintain the security of credentials within the application module and broker module. For example, field management server 150 may establish a secure channel with the application modules and broker modules to perform actions such as activation, configuration changes, key rotation, deactivation, and the like.

Issuer server 160 may comprise a computer server provided by the entity responsible for validating and verifying a credential. Accordingly, issuer server 160 may also be referred to as a verification server.

Figure 2:
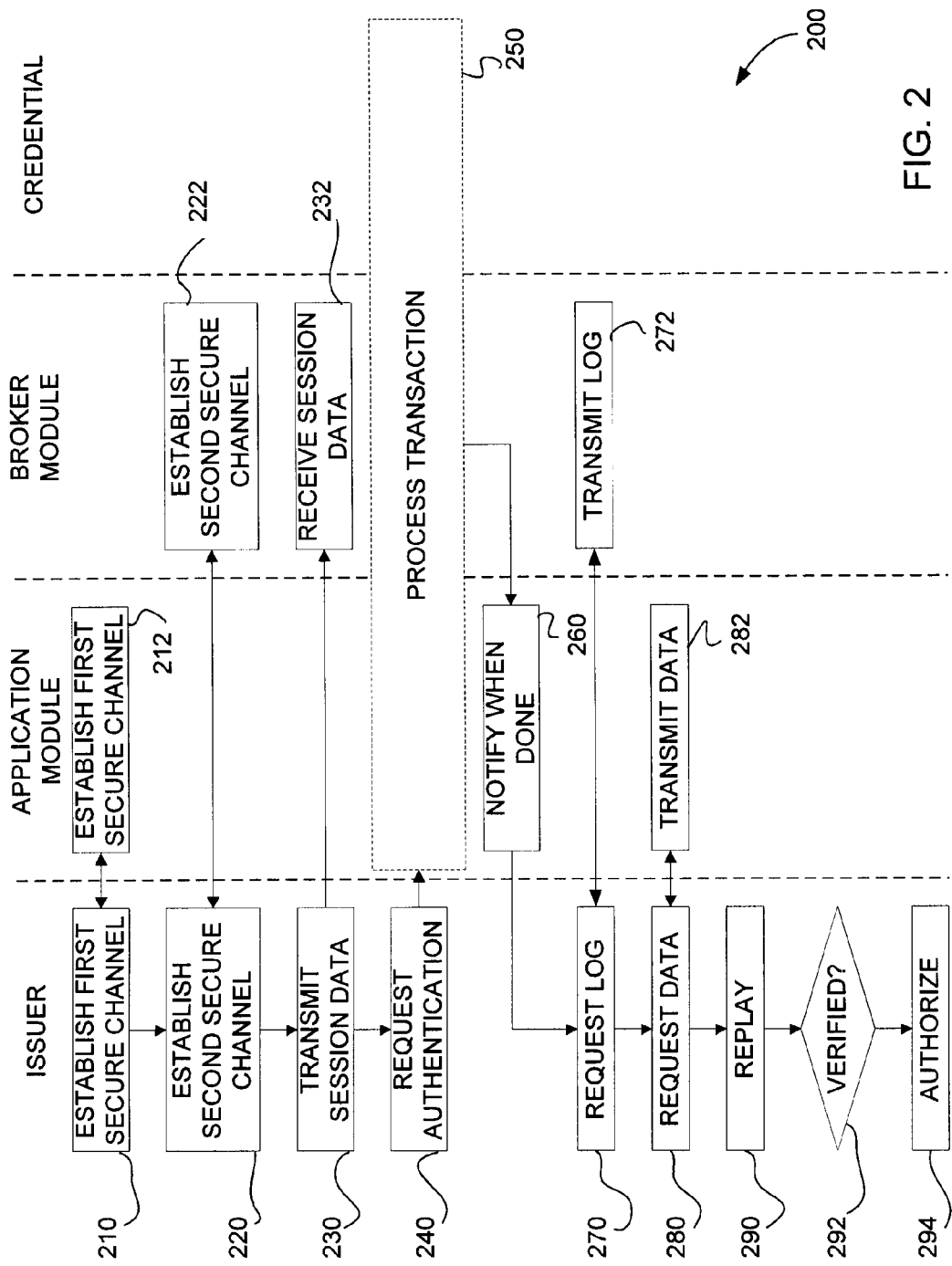
FIG. 2 is an exemplary verification process flow diagram.
Figure 3:
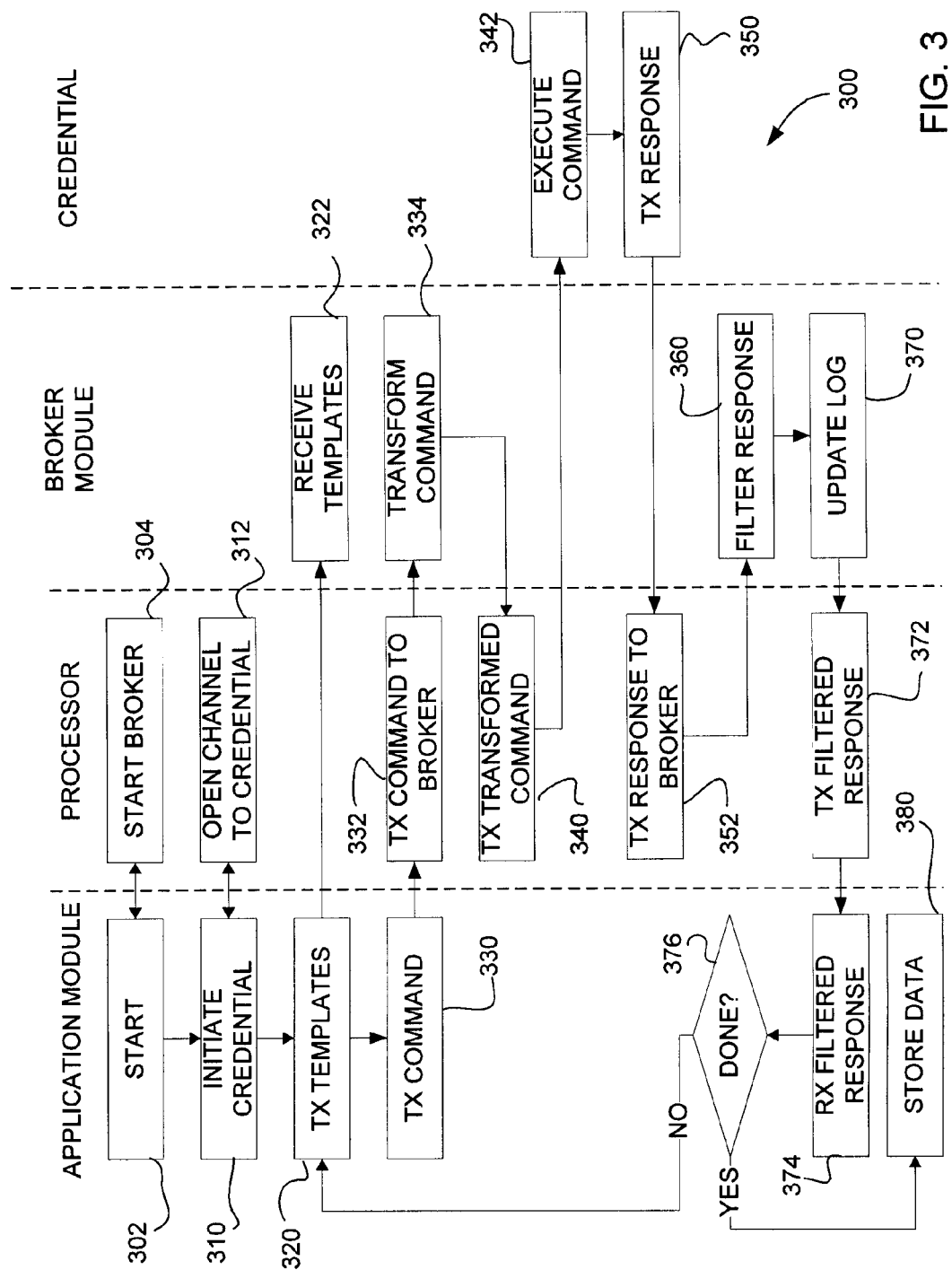
FIG. 3 is an exemplary transaction process flow diagram.
Figure 4:
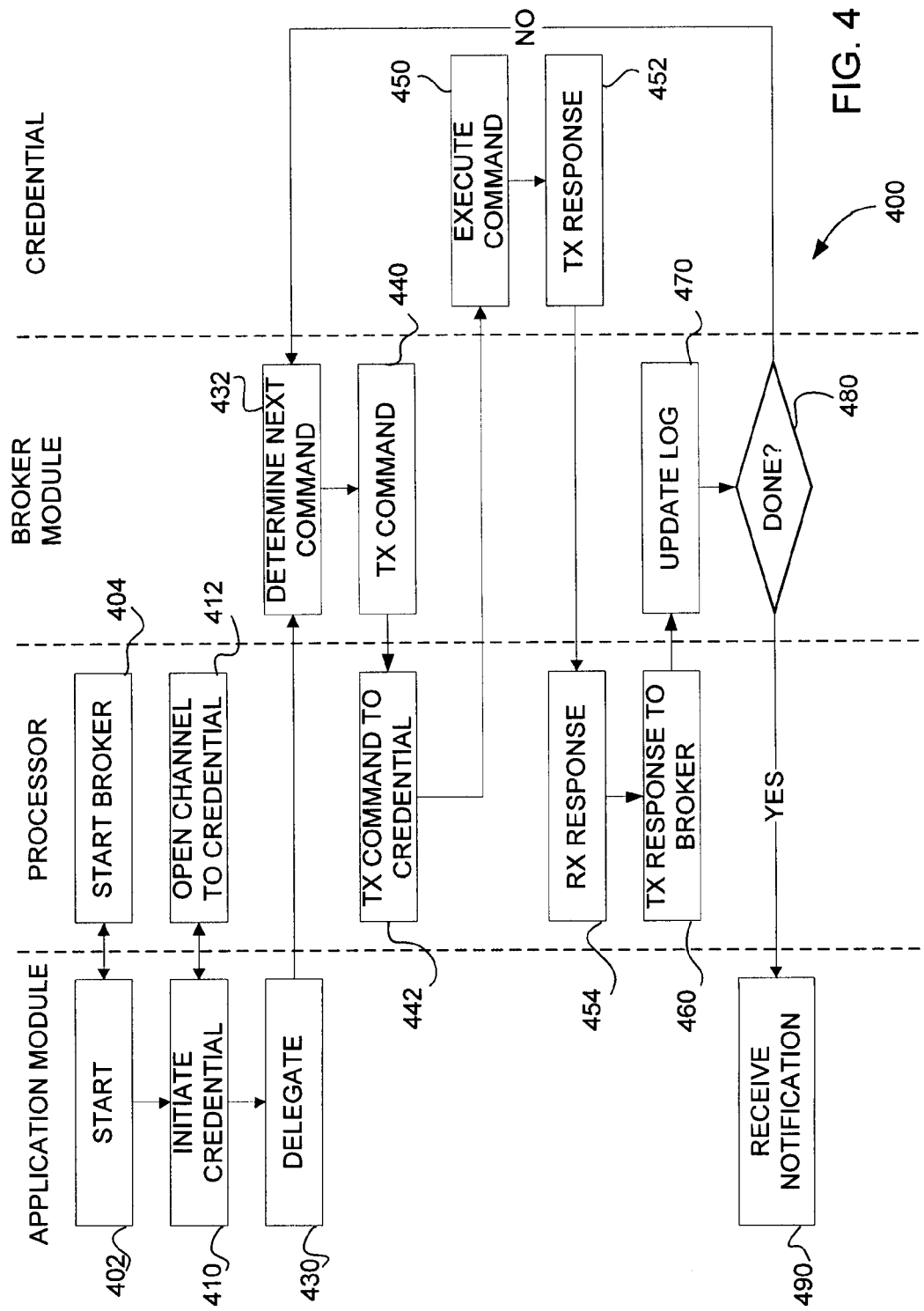
FIG. 4 is an alternative transaction process flow diagram.

For ease of exposition, it is primarily issuer server 160 that is referred to with respect to FIGS. 2 to 4. However, it will be understood that various functions may be consolidated among or delegated between relying party server 140 and 145, field management server 150 and issuer server 160. Accordingly, the term issuer server 160 as used herein is intended to describe functions that could be performed by relying party servers, field management servers and/or issuer servers.

Referring now to FIG. 2, there is shown an exemplary verification process flow diagram. Verification process flow 200 may be initiated, for example, in response to a authentication/transaction request by a user (not shown). If necessary, initial transaction setup and processing may be performed (e.g., user provides PIN to unlock credential and/or broker module 116 functionality).

For ease of exposition, it is assumed here that the broker module is trusted and authorized for use in verification process flow 200. However, in some cases, to provide additional security, there may be a precondition that a broker module first be registered, authenticated and/or associated with a particular user's profile through an external or out-of-band process before the broker module can be used in verification process flow 200.

For example, the first time that a particular credential is used with a particular broker module, an issuer server 160 (or application module 112) may challenge the user using one or more additional authentication methods (e.g., challenge questions, passwords, a security code from the back of the card, billing address, Short Message Service (SMS) message, biometrics, a combination, etc.). If the user successfully authenticates using the one or more additional authentication methods, a unique identifier of the broker module may be stored in the user's profile. Subsequently, issuer server 160 can verify that an authenticated broker is being used, for example when setting up SCP-03 (or TLS) cryptography. Accordingly, the broker module can be authenticated as an identified and previously-associated broker module, and sensitive data can be transmitted via an established secure channel. In some cases, the broker module may employ additional related methods for identifying itself, such as OTPs in lieu of, or in addition to, a unique identifier.

In some cases, the verifying service (e.g., issuer server 160) can have an explicit registration process similar to the above. Similarly, the user or service may have pre-registered (or provided out-of-band) an identifier associated with the broker module device (e.g., serial number).

Similarly, additional security factors, such as a password, may also be required as part of verification process flow 200, although the details of such additional factors are omitted here.

Issuer server 160 and application module 112 establish a first secure channel, at 210 and 212, respectively. The first secure channel can be established using a suitable cryptographic protocol, such as Transport Layer Security (TLS) or the like. Accordingly, subsequent communications between issuer server 160 and application module 112 are encrypted and take place via the first secure channel.

Similarly, a second secure channel can be established by issuer server 160 and broker module 116, at 220 and 222, respectively. The second secure channel may be established using a suitable protocol, such as a modified version of GlobalPlatform Secure Channel Protocol (SCP03), which allows asymmetric authentication using the National Institute of Standards and Technology (NIST) Key Agreement Scheme (KAS). Both asymmetric or symmetric secure channels may be used to secure communication. SCP03 is limited to symmetric protocols, which may be suitable in some cases. However, in some other cases, symmetric protocols may not be suitable. Accordingly, a modified form of SCP03 may be used, which is augmented based on NIST KAS recommendations when using asymmetric mechanisms. In general, symmetric secure channels may be used for communication between the relying party, field management server or issuer server and the broker module. In some cases, server 160 and broker module 116 may also communicate using the Transport Layer Security (TLS) protocol, if both the server and broker module support it.

Accordingly, subsequent communications between issuer server 160 and broker module 116 are encrypted and take place via the second secure channel. In particular, application module 112 and other elements of the operating system, which may not be fully trusted, may be prevented from accessing the second secure channel.

At 230, issuer server 160 may transmit sensitive data, including initial session data, to broker module 116 via the second secure channel, and the initial session data may be received at 232. The initial session data may comprise, for example, an Authentication Session Data Dictionary, which can contain sensitive transaction data. This Data Dictionary may further comprise an indication of correspondence, or mapping, of tags to sensitive data values.

In some variant embodiments, issuer server 160 may be unable to connect to the application module or broker module until after the credential has been processed. Accordingly, the first and second secure channels may not be established until a later time, and issuer server 160 may not transmit the initial session data or other sensitive data at 230.

Accordingly, authentication system 100 may operate in one of two primary modes. In a first "assisted mode", issuer server 160 connects before the credential is processed. Accordingly, in this assisted mode, issuer server 160 can, for example, transmit a session data dictionary and this "dictionary" can be used to fill holes in the commands via the use of templates.

In another "unassisted mode", issuer server 160 does not connect before the credential is processed. Accordingly, in the unassisted mode, issuer server 160 is not yet connected and thus cannot transmit a session data dictionary. However, issuer server 160 can later connect, for example after the credential is processed, in order to retrieve the audit log and sensitive data collected by the broker module, and perform verification.

In either mode, application module 112 may request that broker module 116 fill in "holes" with predetermined data stored or generated at the broker module as described herein. This may be particularly useful in the unassisted mode since the session data dictionary may not be sent by issuer server 160 to the broker module 116.

Accordingly, in such cases, broker module 116 may be configured to supply the sensitive data, including initial session data. For example, the sensitive data may be predetermined data stored at the broker module. The sensitive data may also be, at least in part, generated by the broker module using a suitable algorithm (e.g., pseudorandom number generation). Any such generated data may also be cached or otherwise stored by the broker module 116.

Algorithmic generation of the sensitive data may be particularly useful for generating challenge data for a credential (e.g., terminal random data for a credit card), while maintaining the sensitive data hidden from the application module.

In cases where the issuer server 160 does not provide the initial session data and sensitive data, this data can be later retrieved by the server as part of the verification process (e.g., in similar manner to the transaction data or audit log).

As noted above, sensitive data, including the initial session data, and other data transmitted via the second secure channel, can be hidden from the application module. Each item of sensitive data may have an associated tag and value, which can be used to identify data that should not be revealed to untrusted or semi-trusted elements, as described herein.

In some variant embodiments, at least some of the sensitive data may be provided to application module 112, which can then insert the sensitive data (e.g., terminal random data) into preliminary commands. In some cases, it may even be possible for application module 112 to directly generate a transformed command, in which case it need not be transmitted to broker module 116 before being transmitted to the credential. While this approach may impose a security trade-off, it may nevertheless be useful where, for example, broker module 116 has limited processing power or limited storage, rendering it unable to generate transformed commands or generate and store audit logs.

At 240, issuer server 160 can request authentication, by transmitting an authentication request to application module 112. The authentication request may comprise only the Authentication Session data tags and formats, and not the sensitive data values themselves, which were transmitted to broker module 116 as part of the initial session data. The authentication request may also comprise a number used once, or 'nonce', to identify the session and to prevent later replay attacks. In some cases, for example where issuer server 160 is not yet connected, application module 112 can initiate authentication independently of a request from server 160. Accordingly, application module 112 may initiate a transaction process at 250. Acts 230 and 240 may be performed together or in reverse order.

Referring now to FIG. 3, there is shown an exemplary transaction process 300 flow diagram. Transaction process 300 may be carried out by application module 112, at least one processor 114, broker module 116 and a credential, such as internal credential 118 or external credential 120.

At 302, application module 112 requests a new broker session and processor 114 may initiate the new session at 304. For example, processor 114 may notify broker module 116 that a new broker session has been requested and allocate resources accordingly.

At 310, application module 112 may establish communication with the credential. Accordingly, processor 114 may open a data channel with the credential at 312 and perform additional processing required to establish communication. For example, processor 114 may select a logical channel, issue a "start broker" command and transmit a nonce as part of the channel opening procedure.

The type of data channel used may be dependent on the type of credential. For example, if the credential is a chip-enabled credit card utilizing an ISO/IEC 7816 smart card, the data channel may be opened by the processor by issuing an application protocol data unit (APDU) command to open a new logical channel. If another type of credential is used, for example an ISO/IEC 14443 proximity card, the data channel may be opened using another suitable procedure. For example, processor 114 may attempt to discover a credential by polling for credentials within proximity for a predetermined period.

Similarly, if the credential is an internal credential, a suitable procedure for establishing communication may be followed.

If the credential makes use of APDUs in communication, APDU chaining may be required to transmit long payloads, as ISO/IEC 7816 APDUs have limited length. Long payloads may be necessary, for example, where both the broker module and the credential use APDU-based communication. If a full (or near full) length APDU preliminary command is transmitted for the credential, the broker module may need to receive the full length APDU preliminary command as a payload, plus the standard APDU headers. Accordingly, this combination may exceed APDU length limitations and, therefore, may require chaining.

In addition, once the broker module is initiated, it may be desirable to block further commands (e.g., APDU commands) issued by application module 112 from being delivered to the credential until such time as the broker module completes the transaction. For example, blocking APDU commands from the application module may prevent the situation where conflicting commands are received by the credential. In particular, processor 114 can block the "start broker" command, "stop broker" command and the like.

In one embodiment, blocking may be achieved by reserving a logical channel for exclusive use of the broker module and credential. Accordingly, processor 114 may block (e.g., at all times) any APDUs originating from application module that attempt to use the reserved channel.

In another embodiment, processor 114 may monitor all APDUs for the blocked commands and block such APDUs from being forwarded to the credential.

As described herein, templates may be used to instruct broker module 116 how to behave for each command-response exchange during a transaction.

Typically, this procedure can be performed by having the mobile application leave enough space in the command data for the sensitive value (e.g., by placing zeros instead of data). The mobile application can then provide the offset(s), tag(s) and length(s) to place into the command. The secure element application can truncate and pad the sensitive data to fit into the "hole" in the command data that is reserved for the sensitive value.

At 322, application module 112 may transmit one or more command templates to broker module 116 at 322. Alternatively, or in addition, application module 112 may transmit one or more response templates to broker module 116 at 322.

Command templates may be used to instruct the broker module where and how to provide sensitive data (including sensitive data from the initial session data) in a preliminary command. For example, the command template may identify one or more data tags corresponding to sensitive data that is not accessible by application module 112. Accordingly, the command template may be used to ensure that such sensitive data remains hidden from untrusted elements of the computing system, since application module 112 need only identify the data tags and not the sensitive data itself. In one example, the templates may be considered to contain "holes" which can be "filled" by the broker module.

Correspondingly, response templates may be used to instruct the broker module where and how to filter or remove sensitive data in a preliminary response. For example, the response template may identify one or more data tags corresponding to sensitive data that should be secured (e.g., not revealed to application module 112), and to ensure that such sensitive data remains hidden from untrusted elements of the computing system.

Accordingly, the response template can indicate to the broker module which portions of data in the preliminary response from the credential should be considered sensitive. The broker module can then extract and remove, overwrite or otherwise obfuscate the sensitive data. The extracted or filtered sensitive data can placed into a sensitive data buffer.

In some cases, to prevent a rogue application module from using malicious templates to reveal sensitive data, broker module 116 may require that command and response templates be cryptographically signed by a trusted third party. To provide enhanced security, additional context may be included with the signature, such as: an indication of the command (or portion of the command) to which the template relates; a requirement that certain commands have been executed prior to the use of the signed template (e.g., SELECT of a certain card type); an indication of the syntax to be used in the template (e.g., if certain data elements do not appear in the response, the entire response may be rejected).

At 330, application module 112 may transmit a preliminary command for the credential. If the application module 112 is untrusted or semi-trusted, it may not have access to sensitive data that may be required to generate a complete command that can be executed by the credential. For example, the application module 112 may not be able to directly provide initial session data that includes sensitive data. Accordingly, application module 112 may transmit the preliminary command with a first subset of data that is accessible to application module 112.

Typically, in the context of credit card processing, initial session data, terminal random data and transaction amounts are sent in commands and credit card numbers and cryptograms are returned in the response. Accordingly, in such contexts, application module 112 may not be able to provide a terminal random data or the transaction amount.

Processor 114 may receive the preliminary command from application module 112 and forward the preliminary command to broker module 116 at 332.

In some exemplary embodiments, the preliminary command may be sent by transmitting an APDU with the preliminary command in the data portion of the APDU.

Broker module may receive the command and transform the preliminary command into a transformed command at 334. The transformed command may be generated based on a command template that identifies additional data (e.g., sensitive data) that is required to generate a valid command. In some cases, the command template that preceded the preliminary command may be applied to the preliminary command. In some other cases, the command template to be used may be referenced by a template identifier. In still other cases, the command template may be transmitted together with the preliminary command.

In some cases, the preliminary command may be such that no sensitive data is required to be inserted. Accordingly, the transformed command may be the preliminary command (e.g., the transformation may be omitted). Likewise, the command template may also be omitted.

At 340, the transformed command may be forwarded by processor 114 to the credential, whereupon the credential may execute the transformed command at 342. A preliminary response (e.g., the response to the transformed command generated by the credential) may be transmitted to processor 114 at 352 and forwarded to broker module 360 for further processing. In some cases, the transformed command may instead be forwarded directly by broker module 116, or relayed in encrypted form via application module 112.

The credential then receives the transformed command and generates an appropriate preliminary response. For example, the credential may generate a cryptogram based on the transformed command.

Broker module 116 may receive the preliminary response and transform the preliminary response into a filtered response at 360. The preliminary response may be transmitted directly to broker module 116, via processor 114 and/or in encrypted form via application module 112. The filtered response may be generated based on a response template that identifies additional data (e.g., sensitive data) that should be extracted and removed, modified or otherwise obfuscated before transmission outside the trusted environment. In some cases, the response template that preceded the preliminary command may be applied to the preliminary response. In some other cases, the response template to be used may be referenced by a template identifier. In still other cases, the response template may be transmitted together with the preliminary command.

The data that is extracted (e.g., the filtered data or sensitive data) may be stored in a sensitive data buffer.

In some cases, the preliminary response may be such that no sensitive data is required to be filtered. Accordingly, the filtered response may be the preliminary response (e.g., the filtering may be omitted). Likewise, the response template may also be omitted.

At 370, broker module may create or update an audit log corresponding to the current transaction. The audit log can be updated based on the current command and response exchange. The audit log update may comprise representations of each command and response (including, in some cases, preliminary commands and transformed commands, responses and filtered responses), representations of any command template and response template used, and representations of inserted data and/or filtered data. Each representation may comprise a hash digest of the relevant data.

In a variant embodiment, the audit log may comprise a single representation of the entire transaction. For example, the representation may be a single hash digest of all transaction data, which may be recomputed as new items are added.

In another variant embodiment, the representations may comprise a copy of the relevant data.

In some cases, the audit log may further comprise additional representations, including transaction order information (e.g., command 1, followed by response 1, etc.) start/stop data and/or metadata about the credential, such as its ISO/IEC 14443 unique identifier (UID) or pseudo-unique proximity integrated circuit card identifier (PUPI).

For example, during the brokered transaction, the broker module may be provided with each command-response exchange between the application module and the credential, along with command or response templates. To provide auditing capability, the broker module may generate hash digests (e.g., utilizing SHA-256) of each command, response, template, and other applicable data (e.g., RF field status changes). Broker module 116 may maintain a single audit log containing all hash digests, or maintain discrete logs corresponding to portions of the transaction. Broker module 116 may also cryptographically sign the logs or digests (e.g., using SHA-256 and RSA or ECC). The signed audit logs may later be transmitted to an issuer server 160, for example, within a secure channel.

Periodically, application module 112 may request the sensitive data buffer from the broker module. The sensitive data can be encrypted by the broker module and, optionally, authenticated (e.g., using a message authentication code or MAC) with session keys and the encrypted filtered data can be transmitted to the application module. Accordingly, the broker module can then clear the sensitive data buffer. In this way, broker module can be implemented with a limited size sensitive data buffer, while still enabling a large amount of data to be extracted and hidden from application module 112.

In some cases, this procedure can be implemented by having the application module indicate which tags, lengths or values (TLVs) are considered sensitive or by having the application module indicate which offsets and lengths of the response data are considered sensitive. Many current contact-based and contactless credentials use TLV formatting in their responses. Accordingly, application module 112 can also indicate that only a portion of a tag value is sensitive (e.g., only hide values after the $6^{th}$ nibble of a tag). The application module can also indicate to the broker module to look for nested TLV tags.

In some cases, sensitive data may be identified in terms of whitelists and blacklists. For example, if whitelists are used, only data specified in the whitelist will be returned to the application module. Conversely, if blacklists are used, only data specified in the blacklist will be blocked from the application module.

As noted above, in some cases, the filtered data may be stored in the sensitive data buffer for later use during verification. The filtered data may also be encrypted using, for example, a symmetric cipher, and the cipher key stored for later use during verification. In particular, encrypted filtered data may be cached at the application module 112, with the broker module retaining the cipher key.

At 372, the filtered response may be transmitted to application module 112, which receives the filtered response at 374 and stores the filtered response, along with the preliminary command (transmitted at 330), at 380.

In some cases, application module 112 may request the encrypted filtered data from broker module 116 (not shown). In particular, if broker module 116 has limited storage capability, application module 112 may instead retain the encrypted version of the filtered data for later use during verification. Accordingly, broker module 116 retains the cipher key.

At 376, application module 112 may determine if a further command should be issued. If a further command is to be issued, application module 112 may return to 320. Otherwise, application module may complete process 300 by storing data (e.g., templates, preliminary commands, filtered responses, etc.) at 380 and returning to process 200.

Referring once again to FIG. 2, upon completion of transaction process 300, application module 112 may notify issuer server 160 of the result of the transaction process.

Issuer server 160 may request an audit log from broker module 116 corresponding to the transaction process at 270. Accordingly, broker module 116 may transmit the audit log via the second secure channel. The audit log may comprise the representations of the Authentication Session Data, e.g., commands, responses, command templates, response templates and filtered data—at 272 in response to the request. The audit log may also comprise or be accompanied by the encrypted filtered data, if stored by the broker module, and the cipher key required to decrypt the filtered data. In some cases, the audit log data may be cryptographically signed by the broker module.

In some cases, to prevent replay attacks, the audit log data, or the signature data, may also contain the nonce previously provided by issuer server 160 at the outset of the session. Additionally, the broker module 116 may also provide its own nonce associated with the audit log data. Metadata, such as version information, associated with the broker module may also be provided.

In some cases, such as where encrypted filtered data is cached at the application module, the cipher key used to encrypt the filtered data may also be transmitted via the second secure channel.

Similarly, at 280, issuer server 160 may request session data—comprising preliminary commands, filtered responses and command and response templates—from application module 112 via the first secure channel. The session data may also comprise the encrypted filtered data, if not stored by the broker module. Accordingly, application module 112 may transmit the session data at 282 in response to the request. Metadata, such as version information, associated with the application module may also be provided.

At 290, issuer server 160 can validate the session by simulating or replaying the entire sequence of commands and responses transmitted between the application module 112, broker module 116 and the credential, to ensure that the transaction was performed properly. If order information is provided, issuer server 160 may also validate that the commands and responses were provided in the correct order.

In particular, issuer server 160 can use the command and response templates supplied by application module 112 and the encrypted filtered data, which can be decrypted using the cipher key, to reconstruct transformed commands and preliminary responses and produce the entire chain of commands and responses. Issuer server 160 may also use metadata information provided by the application module and broker module to emulate the corresponding version of each module. Server-side hash digests of the reconstructed commands and responses can be generated and compared to the hash digests comprised in the audit log received from the broker module.

If application module 112 has used incorrect templates, or misrepresented the templates that were actually used, this may be an indication that the application module is malicious. Accordingly, issuer server 160 can take steps to invalidate the transaction, or to prevent the application module 112 from performing a future transaction. Optionally, a cardholder may be notified of the problem, either automatically or by an administrator.

If the server-side hash digests correspond to the audit log, the corresponding authentication and transaction may be verified by issuer server 160 at 292.

Referring now to FIG. 4, there is shown a process flow diagram for an exemplary transaction process in accordance with an alternative embodiment. Acts 402, 404, 410 and 412 of transaction process 400 generally correspond to acts 302, 304, 310 and 312 of transaction process 300. However, at 430, application module 112 may delegate the transaction process to broker module 116 by transmitting a delegation command. The delegation command may comprise instructions for the transaction process to be carried out by broker module 116. In some cases, the delegation command may also comprise at least one response template. In such embodiments, broker module 116 would be configured with parsing instructions suitable for the credential.

Accordingly, process 400 enables the broker module to read a credential independently of the computing system's own operating system. In such cases, application modules may be prevented from directly accessing the credential, for example, if the credential reader device communicates securely with the broker module, and will only disclose data to the broker module.

In such cases, processor 114 may be considered part of the trusted environment while operating at a low-level, independently of the computing system's operating system.

At 432, broker module 116 receives the delegation command and determines a next command to be issued to the credential. The command is then transmitted to the credential at 440, via processor 114 at 442. Accordingly, the credential executes the command at 450 and generates a response at 452. The response can be received by processor 114, at 454, and transmitted to broker module 116, at 460.

Accordingly, upon receiving the response, the broker module 116 may update its audit log at 470.

At 480, broker module 116 determines if any further commands should be issued. If further commands are to be issued, broker module 116 returns to 432. Otherwise, broker module 116 transmits a notification to application module 112 that the delegated process is complete. The notification may comprise additional data relating to the delegated process, although sensitive data may be filtered or removed, for example, based on a response template.

In some variant embodiments, a broker module in a specialized trusted environment (e.g., a secure peripheral device) may be permitted to directly send commands to a credential using an independent hardware path, and to execute its own credential parsing code. This process can be functionally similar to process 400, except that processor 114 can be bypassed via the independent hardware path.

In certain embodiments, a broker server (not shown) connected via a data network, such as USB, I2C, UART, ISO 7816, ISO 14443, Bluetooth™, Ethernet, IEEE 802.11, and the like, may act as the broker module for process 300 or process 400. For example, the broker server may be a networked credential reader device. In such cases, the broker server may send each command and receive each response in a secure channel between itself and the credential reader or trusted environment attached to the credential reader.

In some cases, a credential may be stored on a device available via a data network. Such a "cloud" credential may be used instead of a physical credential. Accordingly, broker module 116 may be configured to interact with the cloud credential via the network rather than via a hardware interface or processor 114.

In addition, if a cloud credential is used, broker module may interact with the cloud credential as in process 300 or process 400, but optionally request that audit logs and session data be transmitted directly to issuer server 160, rather than sent via application module 112.

In some cases, an application module may be in communication with both the credential and broker module. Accordingly, the application module may act as a relay or "hop" to facilitate communication between the credential and broker module. To ensure that sensitive data is not revealed to the application module, any such communications that are relayed by the application module may be encrypted by the broker module and/or credential.

The embodiments provided herein are described primarily with respect to contact and contactless smart card credentials. However, the described systems and methods may also be used to broker and authenticate transactions in a variety of contexts, including but not limited to network communications, biometrics and the like.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

It will be appreciated that various embodiments may comprise one or more special purpose or general purpose computers or servers, each of which may include, but are not limited to, one or more processors, memories, storage devices, input/output devices and network interfaces. Likewise, the terms 'computer' and 'server' may be interchangeable in accordance with the above description. Furthermore, embodiments may be implemented as computer software instructions stored on a non-transitory computer readable medium and executed in memory by processors on one or more of the computers or servers contemplated above. Although embodiments have been described as separate components, it will be understood that various components could be combined into a single computer or server, or implemented across multiple computers or servers all connected via a communications medium such as the Internet.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein.

The invention claimed is:

1. A method of performing a secure transaction between an application module and a credential, the method comprising:
    a) determining, using a processor, a preliminary command to be sent to the credential, wherein the preliminary command further comprises a response template, wherein the response template comprises at least one response tag associated with at least one sensitive data item;
    b) transmitting the preliminary command from the application module to a broker module;
    c) generating a transformed command based on the preliminary command;
    d) transmitting the transformed command to the credential;
    e) receiving a preliminary response from the credential;
    f) at the broker module, generating a transformed response, wherein the broker module has access to at least one sensitive data item to which the application module does not have access, wherein the broker module extracts and obscures the at least one sensitive data item when the transformed response is generated based on the at least one response tag;
    g) transmitting the transformed response to the application module; and
    h) verifying the secure transaction at a verification server, wherein the verifying comprises:
        transmitting an audit log to the verification server via the secure session;
        transmitting the preliminary command and the transformed response from the application module to the verification server;
        at the verification server, reconstructing a reconstructed transformed command and a reconstructed preliminary response based on the preliminary command, the transformed response and the audit log;
        extracting at least one hash digest from the audit log; and
        comparing the at least one hash digest extracted from the audit log to a newly-generated at least one hash digest of the reconstructed transformed command and the reconstructed preliminary response.

2. The method of claim 1, wherein the transformed command is generated by the application module.

3. The method of claim 1, wherein the transformed command is generated by the broker module and transmitted securely to the application module.

4. The method of claim 1, wherein the transformed command is transmitted securely from the application module.

5. The method of claim 1, wherein the preliminary response is transmitted securely to the application module.

6. The method of claim 1, further comprising, prior to generating the transformed command, transmitting the at least one sensitive data item from a verification server to the broker module via a secure session.

7. The method of claim 1, further comprising, prior to generating the transformed command, generating the at least one sensitive data item at the broker module.

8. The method of claim 1, wherein the at least one sensitive data item comprises predetermined data stored at the broker module.

9. The method of claim 1, wherein the command template comprises a command tag associated with at least one sensitive data item, and wherein the broker module inserts the at least one sensitive data item when the transformed command is generated.

10. The method of claim 1, wherein the transformed response is based on the response template.

11. The method of claim 1, wherein the response template comprises a whitelist that identifies at least one non-sensitive data item, and wherein the at least one non-sensitive data item is to be revealed to the application module.

12. The method of claim 1, further comprising, simulating the reconstructed transformed command to obtain a simulated preliminary response, and comparing the simulated preliminary response to the reconstructed preliminary response.

13. The method of claim 1, further comprising transmitting the command template and the response template from the application module to the verification server, wherein the reconstructing is also based on the command template and the response template.

14. The method of claim 1, wherein the application module and the broker module are provided on a single computing device.

15. The method of claim 1, wherein the application module and the broker module are provided on one or more separate devices, and wherein the application module and the broker module communicate via a data network.

16. A method of verifying a secure transaction between an application module that is untrusted and a credential that is trusted, the method comprising:
    a) performing the secure transaction between the application module and the credential via the broker module to generate transaction data, the transaction data comprising one or more commands and one or more responses;
    b) filtering the transaction data that is transmitted to the application module to remove at least one sensitive data item;
    c) transmitting the filtered transaction data from the application module to the verification server;
    d) transmitting verification data corresponding to the transaction data from the broker module to the verification server via a secure session, the verification data comprising an audit log based on the transaction data;

e) at the verification server, generating reconstructed transaction data based on the at least one sensitive data item and the filtered transaction data; and f) determining if the reconstructed transaction data corresponds to the transaction data.

17. The method of claim 16, wherein the filtered transaction data further comprises at least one template used in the secure transaction and the verification data comprises a first hash digest of the at least one template, further comprising generating a second hash digest of the at least one template at the verification server, and comparing the second hash digest to the first hash digest of the at least one template transmitted by the broker module.

18. A system for performing a secure transaction, the system comprising:

a credential;

a verification server comprising a verification memory and a verification processor;

a broker module comprising a broker memory and a broker processor; and an application module comprising an application memory and an application processor, wherein the application processor is configured to:
  determine a preliminary command to be sent to the credential, wherein the preliminary command further comprises a response template, wherein the response template comprises at least one response tag associated with at least one sensitive data item; and
  transmit the preliminary command to a broker module, and wherein the broker processor is configured to:
  generate a transformed command based on the preliminary command;
  transmit the transformed command to the credential;
  receive a preliminary response from the credential;
  generate a transformed response, wherein the broker module has access to at least one sensitive data item to which the application module does not have access, wherein the broker module extracts and obscures the at least one sensitive data item when the transformed response is generated based on the at least one response tag; and
  transmit the transformed response to the application module, and wherein the verification processor is configured to:
  receive an audit log via the secure session;
  receive the preliminary command and the transformed response from the application module;
  reconstruct a reconstructed transformed command and a reconstructed preliminary response based on the preliminary command, the transformed response and the audit log;
  extract at least one hash digest from the audit log; and
  compare the at least one hash digest extracted from the audit log to a newly-generated at least one hash digest of the reconstructed transformed command and the reconstructed preliminary response.

19. The system of claim 18, wherein prior to generation of the transformed command, the verification processor is further configured to transmit the at least one sensitive data item to the broker module via a secure session.

20. The system of claim 18, wherein prior to generation of the transformed command, the broker processor is configured to generate the at least one sensitive data item.

21. The system of claim 18, wherein the at least one sensitive data item comprises predetermined data stored at the broker module.

22. The system of claim 18, wherein the command template comprises a command tag associated with at least one sensitive data item, and wherein the broker processor inserts the at least one sensitive data item when the transformed command is generated.

23. The system of claim 18, wherein the response template comprises a whitelist that identifies at least one non-sensitive data item, and wherein the at least one non-sensitive data item is to be revealed to the application module.

24. The system of claim 18, wherein the verification server is configured to receive the command template and the response template from the application module, wherein the reconstructing is also based on the command template and the response template.

* * * * *